United States Patent [19]

Sugimori et al.

[11] Patent Number: 5,187,244
[45] Date of Patent: Feb. 16, 1993

[54] PREPARATION PROCESS OF BLOCK COPOLYMERS AND RESULTING BLOCK COPOLYMERS

[75] Inventors: Masahiro Sugimori, Nagoya; Haruko Takeda, Fujisawa; Seiji Tone, Ohtake, all of Japan

[73] Assignee: Mitsubishi Rayon Co., Ltd., Tokyo, Japan

[21] Appl. No.: 381,864

[22] Filed: Jul. 19, 1989

[30] Foreign Application Priority Data

Jul. 22, 1988 [JP] Japan .................. 63-183085

[51] Int. Cl.$^5$ .......................................... C08F 283/12
[52] U.S. Cl. ................................ 525/479; 526/190; 526/192; 528/16; 528/19; 528/21; 528/23; 528/26
[58] Field of Search ................ 525/429; 528/26, 16, 528/19, 21, 23; 526/190, 192, 279

[56] References Cited

U.S. PATENT DOCUMENTS

| | | | |
|---|---|---|---|
| 3,862,097 | 1/1975 | Milkovich et al. | 518/392 |
| 4,588,795 | 5/1986 | Dicker et al. | 526/192 |
| 4,711,942 | 12/1987 | Webster | 526/185 |
| 4,940,760 | 7/1990 | Boettcher et al. | 526/190 |

FOREIGN PATENT DOCUMENTS

68887  1/1983  European Pat. Off. .

*Primary Examiner*—Ralph H. Dean, Jr.
*Attorney, Agent, or Firm*—Oblon, Spivak, McClelland, Maier & Neustadt

[57] ABSTRACT

A preparation process of block copolymers which comprises conducting living polymerization of a (meth)acrylic ester substantially in the absence of water, by using a macromolecular compound having a functional end group represented by the formula (1):

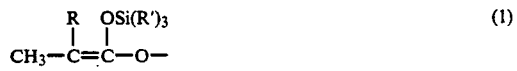

Wherein R is H or an n-alkyl group having from 1 to 3 carbon atoms and R' is H or an alkyl group having from 1 to 6 carbon atoms, as a polymerization initiator and in the presence of a Lewis acid or in the presence of a donor compound of an anion selected from $HF_2^-$, $(CH_3)_3SiF_2^-$ or $F^-$, as well as novel block copolymers prepared therefrom are disclosed.

10 Claims, No Drawings

PREPARATION PROCESS OF BLOCK COPOLYMERS AND RESULTING BLOCK COPOLYMERS

BACKGROUND OF THE INVENTION

1. Field of the Invention

The present invention relates to a process for preparing block copolymers which are useful as functional polymers such as surface modifiers of polymeric materials, compatibilizers of polymer alloys and materials for coatings and membranes, as well as novel block copolymers prepared therefrom. More particularly, the present invention relates to a process for preparing novel block copolymers containing a (meth)acrylic ester as one of the segments and the novel block copolymers prepared therefrom.

2. Description of the Prior Art

Block copolymers containing polymer chains A and B of different structures which are connected in the form of A—B or A—B—A provide characteristics of both the polymer chain A and the polymer chain B. Consequently, it has been known that block copolymers have good prospects as functional polymers such as surface modifiers, compatibilizers and materials for coatings and membranes. However, the synthesis of block copolymers itself is not easy and, in particular, there is almost no method for mutually connecting polymer chains having quite different properties. Accordingly, the practical use of block copolymer has been considered to be difficult.

For example, even in anion living polymerization, which is most commonly used for the synthesis of block copolymers, monomer types which are capable of polymerization are limited. As a result, block copolymers have not yet been in practical use except for styrene-dien base block copolymers. An attempt has also been tried to prepare block copolymers by radical polymerization in the presence of polymeric peroxides. The polymeric peroxides, however, are dangerous to handle and cannot precisely control the structure of the resulting polymers and hence have not yet been employed for practical utilization. Additionally, synthesis of block copolymers has been tried by reacting high-molecular compounds with each other. However, since reaction conditions such as selection of a common solvent are difficult to set and efficiency of block polymerization is low as well, this process has also not yet been applied to actual production.

As a means for the synthesis of block copolymers, Japanese Patent Laid-Open No. 13603 (1983) disclosed a so-called group transfer polymerization method. The method described in the specification is effective in practical use only for acrylic monomers such as methacrylic esters and acrylic esters. Thus, when the polymer chains have quite different structures, synthesis of block copolymer by connecting the polymer chains with each other is also deemed to be difficult in this method.

SUMMARY OF THE INVENTION

An object of this invention is to provide a novel process for the preparation of block copolymers in order to provide various kinds of the novel and useful block copolymers.

Another object of this invention is to provide novel block copolymers which are prepared by the above novel process and are useful as surface modifiers of polymers, compatibilizer of polymer alloys and a coating materials.

In other words, one aspect of this invention is a process for preparing block copolymers which comprises conducting living polymerization of (meth)acrylic ester substantially in the absence of water, by using a macromolecular compound having a functional end group represented by the formula (1):

wherein R is H or an n-alkyl group having from 1 to 3 carbon atoms and R' is H or an alkyl group having from 1 to 6 carbon atoms, as a polymerization initiator and in the presence of a Lewis acid or in the presence of a donor compound of anion selected from $HF_2^-$, $(CH_3)_3SiF_2^-$ or $F^-$.

Another aspect of this invention is a block copolymer represented by the formula:

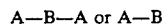

wherein segment A consists of a poly(meth)acrylic ester unit, segment B essentially consists of a

unit or a unit derived from an alkylene oxide, and segment A and segment B are connected via a unit derived from the group represented by the above formula (1).

DETAILED DESCRIPTION OF THE PREFERRED EMBODIMENT

The macromolecular compound being used for the process of this invention and having the functional end group represented by the above formula (1) can be preferably illustrated by those compounds having the following formulas (2) or (3):

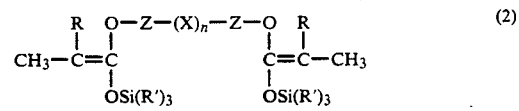

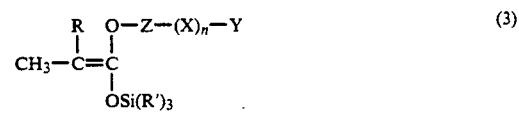

wherein R is H or an n-alkyl group having from 1 to 3 carbon atoms; R' is H or an alkyl group having from 1 to 6 carbon atoms; n is an integer of 5 or more; X is arbitrary recurring units of a polymer; Y is an inactive end group; and Z is a single bond, a polymethylene group having 5 or less carbon atoms which may have a methyl side-chain, —(W—O)$_m$—, or —W—O—W— wherein W is a polymethylene group having 5 or less carbon atoms and may have a methyl side chain, and m is an integer of from 1 to 5.

The term "inactive" group in the above formula (3) means the absence of reactive groups in any steps of reacting the compound HO—Z—(x)$_n$—Y with the compound

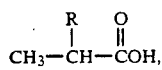

silylating the resultant ester to prepare the compound of the formula (3), and polymerizing methacrylic ester in the presence of said compound. Examples of the reactive groups are active hydrogen containing groups such as a hydroxyl group, a carboxyl group, an amino group and a monoalkylamino group; and a polymerizable double bond. Exemplary Y in the above formulas includes, for example, an alkyl group; an aryl group; an aralkyl group; an alkyl, aryl or aralkyl ester group; an alkylcarbonyl group and a dialkylamino group, but is not restricted to these groups.

The recurring units represented by X above, i.e., the principal recurring units of the macromolecular compound having the functional end group represented by the formula (1), constitute a major component of one of the segments in the block copolymer. Any kind of recurring units may be permitted so long as the units can form polymers by polymerization or condensation. Suitable examples of the units include various types of recurring units such as a recurring unit derived from a monomer having an ethylenically unsaturated linkage, a recurring unit having ester linkage, a recurring unit having amide linkage and recurring unit having ether linkage. These units may be suitably selected depending upon the object for use.

When X is recurring units derived from (meth)acrylic ester, the units tend to hinder the block copolymer from sufficient exhibition of its characteristics. It is preferred to use recurring units other than those derived from (meth)acrylic ester. However, (meth)acrylic ester is not necessarily excluded.

Exemplary suitable recurring units for use in the process of this invention include:

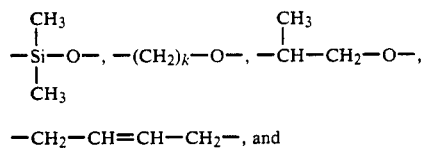

—CH$_2$—CH=CH—CH$_2$—, and

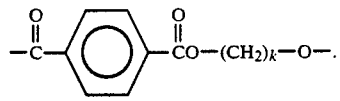

wherein k is an integer of from 1 to 12. Among these recurring units, preferred units are:

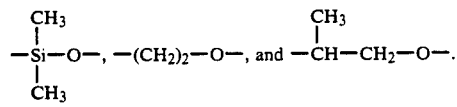

The polymerization degree of the macromolecular compound having the functional end group of the formula (1), i.e., the value of n in the formulas (2) and (3), is 5 or more and preferably from 10 to 300. When the polymerization degree is less than 5, the length of the segment composed of this macromolecular compound in the block copolymer is too short to exhibit the specific characteristics of this segment. Consequently, it is difficult to exert the features of the block copolymer. When the polymerization degree is more than 300, synthesis of the initiator or the block copolymer is apt to become difficult and there are no merits. The macromolecular compound can also be defined by the number average molecular weight. The number average molecular weight of the macromolecular compound is generally from 400 to 100,000, and preferably from 1,000 to 30,000.

When a silicon base segment is used for the recurring units of the macromolecular compound having the functional end group of the formula (1), preferred —Z— is —W—, —(W—O)$_m$— or —W—O—W— wherein W is a polymethylene group having 5 or less carbon atoms and may have a methyl side-chain, and m is an integer of from 1 to 5, because it is easy to introduce hydroxyl groups into one or both ends of the silicon base compound. More preferred —Z— is —W— or —W—O—W—.

When the recurring units of the macromolecular compound having the functional end group of the formula (1) contain ester groups or amide groups, —Z— may be a single bond.

R in the formulas (1), (2) and (3) is H, a methyl group, an ethyl group or a n-propyl group. In the preparation of the compounds having the formulas (2) and (3) by the process described below, the raw material carboxylic acids having structures corresponding to R above react with HO—Z—(X)$_n$—Z—OH or HO—Z—(X)$_n$—Y. Successively, abstraction reaction is carried out on the hydrogen atoms bonded to the carbon atoms of the α-position. R is selected in view of the fact that these reactions are carried out with ease and that the raw material carboxylic acids are readily available. In other words, the raw material carboxylic acids which can be used for the preparation of the compounds having the formulas (2) and (3) are propionic acid (R=H), isobutyric acid (R=methyl group), 2-methylbutyric acid (R=ethyhl group) and 2-methylvaleric acid (R=n-propyl group). Methyl group is preferred for R because of ready availabiltiy of the corresponding carboxylic acid and ease of reaction.

R' is H or an alkyl group having from 1 to 6 carbon atoms and preferably a methyl group in view of raw material availability. Alkyl groups having 7 or more carbon atoms can also be used. However, the raw materials of these alkyl groups are difficult to obtain and there is no particular reason for the use of alkyl groups having 7 or more carbon atoms in place of hydrogen or the alkyl group having from 1 to 6 carbon atoms.

Any kind of (meth)acrylic ester can be used for the living polymerization of the present invention. Exemplary suitable (meth)acrylic ester include, for example, methyl (meth)acrylate, ethyl (meth)acrylate, n-butyl (meth)acrylate, 2-ethylhexyl (meth)acrylate, 2,2,2-trifluoroethyl (meth)acrylate, 2,2,3,3-tetrafluoropropyl (meth)acrylate, 2-trimethylsilylethyl (meth)acrylate and trimethylsilyl (meth)acrylate. The (meth)acrylic ester may be used singly or as a blend of (meth)acrylic esters. A small amount of other copolymerizable monomers can also be added to (meth)acrylic ester. Multifunctional (meth)acrylic ester can also be incorporated when necessary. When multistage polymerization is carried out by the addition of a different (meth)acrylic ester in each step, a plurality of (meth)acrylic ester segments can also be built in the block copolymer.

A further description will hereinafter be made of the preparation process of the block copolymer in the present invention.

A polymer having a hydroxyl group at one or both ends of the polymer chain is used for the raw material. A diol derived from polydimethylsiloxane, having hydroxyl groups at both ends of the polymer chain and represented by the following formula is commercially available.

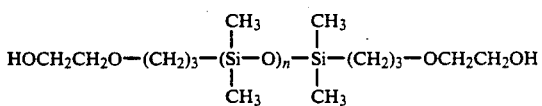

A polyester having hydroxyl groups at both ends of the polymer chain can be obtained by using diol in excess in the reaction of dicarboxylic acid or dicarboxylic acid diester with the diol. A polyester having a hydroxyl group at one end of the polymer chain alone can also be prepared by adding a suitable amount of mono-ol in a similar reaction. The latter type of polyester can also be prepared by carrying out condensation or oligomerization of monohydroxymonocarboxylic acid chloride and by simultaneously using a small amount of mono-ol Polyamide having a hydroxyl group at one or both ends can also be prepared by the same procedures.

Polyether naturally has hydroxyl groups at the end of polymer chain. Vinyl polymerization (oligomerization) can introduce hydroxyl groups by utilizing the functionality of a polymerization initiator or a chain transfer agent remaining at the end of the polymer chain or by carrying out anion living polymerization using an alkylene glycol as a terminator.

Preparation of the compounds having the formulas (2) and (3) will hereinafter be described by using the R=methyl group as the example.

At the first step, a polymer having a hydroxyl group at one or both ends of the polymer chain is reacted with isobutyric acid. The reaction may be conducted under the same conditions as those in the usual condensation reaction of alcohol and acid. For example, the above polymer is mixed with isobutyric acid by using, if necessary, a solvent such as benzene. The reaction may be carried out in the presence of a dehydrating catalyst such as p-toluenesulfonic acid by continuously removing the generated water.

In the next step, a methine proton is abstracted from the isobutyryl group in the above polymer where at least one end of the polymer chain is esterified with isobutyric acid. The abstraction of the methine proton is conducted, for example, by a reagent such as lithium diisopropylamide. The resultant end group is successively converted to ketene silyl acetal by reacting with a silylating agent such as trimethylsilyl chloride. The macromolecular initiators represented by the formulas (2) and (3) for use in the present invention can be thus prepared.

For example, to a THF solution of lithium diisopropylamide (hereinafter abbreviated as LDA) prepared from n-butyllithium and diisopropylamine at 0° C., the polymer prepared in the first step is gradually added, if necessary, in the form of a THF solution. Then, an excess amount of silylating agent such as trimethylsilyl chloride is added. The polymer having at least one end group which has been converted to ketene silyl acetal can be thus prepared.

Exemplary suitable silylating agents which can be used include, for example, trimethylsilyl chloride, tri-n-butylsilyl chloride, t-butyldimethylsilyl chloride, hexamethyldisilazane, hexaethyldisilazane, hexaisobutyldisilazane and hexa-t-butyldisilazane.

The above provess is preferable for the synthesis of the polymer having at least one end group converted to ketene silyl acetal and is used for the initiator in the process of this invention. However, the synthetic method of the macromolecular initiator is not necessarily limited to the above process.

In the process of this invention, the block copolymer can be prepared by conducting living polymerization of (meth)aclrylic ester initiated with the macromolecular compound which has been prepared by the above process, substantially absence of water such as in an inert gas atmosphere or under a high vacuum, in the presence of a Lewis acid such as $ZnCl_2$, $ZnBr_2$ or $ZnI_2$, or in the presence of a donor compound of an anion selected from $HF_2^-$, $(CH_3)_3SiF_2^-$ and $F^-$. The macromolecular initiator and the catalyst may be added into a reaction vessel previously charged with (meth)acrylic ester.

The macromolecular compound having the functional group of the formula (1) at both ends of the polymer chain forms a tri-block copolymer of the A—B—A type. On the other hand, the macromolecular compound having the functional group at one end alone forms a di-block copolymer of the A—B type. In these formulas, segment A means poly(meth)acrylic ester segment. The number average molecular weight of one segment A is generally from 1,000 to 300,000, and preferably from 3,000 to 100,000.

Representative Lewis acid compound which act as a catalyst include, for example, zinc halides such as $ZnCl_2$, $ZnBr_2$ and $ZnI_2$; mono- and di-alkylaluminum halides; dialkylaluminum oxides; and compounds disclosed in above Japanese Patent Laid-Open No. 13603 (1983). Zinc halides are preferred among these compounds.

Exemplary suitable donor compound of anions such as $HF_2^-$, $(CH_3)_3SiF_2^-$ and $F^-$ which act as a catalyst include, for example, tris-dimethylsulfonium salts (hereinafter abbreviated as TAS) of $HF_2^-$ and $(CH_3)_3SiF_2^-$ i.e., $TAS^+HF_2^-$ and $TAS^+(CH_3)_3SiF_2^-$; and tetrabutylammonium fluoride $[(C_4H_9)_4N^+F^-]$.

The polymerization reaction for preparing the block copolymer of this invention may be conducted without a solvent but is generally preferably to carried out in a suitable solvent. Exemplary suitable solvents for use in the presence of the Lewis acid catalyst include, for example, chlorinated hydrocarbons such as dichloromethane and 1,2-dichloroethane, and toluene. Solvents such as tetrahydrofuran which react with Lewis acids are unsuitable. Exemplary suitable solvents for use in the presence of the anion donor compound as a catalyst include, for example, tetrahydrofuran (THF), toluene and acetone. Halogenated hydrocarbon base solvents such as chloroethylene and chloroform are unsuitable. These solvents must be sufficiently dehydrated and purified before use according to normal procedures. When the dehydration and purification of the solvents are unsatisfactory, living polymerization of (meth)acrylic ester does not proceed and hence the desired block copolymer cannot be obtained. Similarly, the reaction must be carried out in a fully dehydrated and purified inert gas atmosphere or under a high vacuum.

In the preparation of the block copolymer, the ratio of the initiator to (meth)acrylic ester monomer is suitably in a mole ratio ranging from 10 to 500.

In the process of the present invention, the poly(meth)acrylic ester segment, i.e., segment A, is prepared by living polymerization. Accordingly, the poly(meth)acrylic ester segment itself can also be prepared in the form of a block copolymer. For example, polymerization of butyl acrylate is previously carried out by using the macromolecular initiator, and then methyl acrylate is added and polymerized to obtain a block copolymer of the [PMA-PBuA]-B type.

Synthesis of the block copolymer in the process of this invention can be carried out in the temperature range of from $-100°$ C. to $100°$ C. The preferred temperature range is from $-75°$ C. to $60°$ C.

The invention will be further illustrated by way of examples hereinafter, which illustration is not intended to limit the scope of the invention.

"parts" in the examples mean parts by weight.

The values of molecular weight and molecular weight distribution are polystyrene reduced molecular weights measured under the following conditions according to the GPC method.

MEASURING CONDITIONS OF GPC

Equipment: Waters Co. Model 201D, compact type.
Column: TSK gel GMHXL+4000 HXL+2500 HXL
Solvent: THF
Temperature: 30° C.
Flow rate: 0.7 ml/min
Sample concentration: 1%

Further, the values of glass transition temperature Tg shown in the examples were measured with a differential scanning calorimeter at a temperature rise rate of 20° C./min.

EXAMPLE 1

Synthesis of Silicon Base Macromolecular Initiator

A solution obtained by dissolving 20 mmol of a diol derived from polydimelthylsiloxane, having hydroxyl groups at both ends of the polymer chain and represented by the formula below (number average molecular weight: about 3200) and 65 mmol of isobutyric acid 0.15 mmol of p-toluenesulfonic acid in about 100 ml of benzene was refluxed for 6 hours.

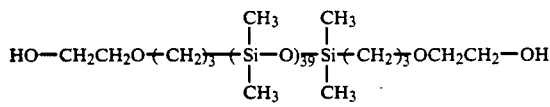

During the reaction, generated water was removed by adsorption on a molecular sieve packed in a condenser. A silicon base compound esterified with isobutyric acid at both ends of the polymer chain was thus formed.

The reaction mixture had the solvent distilled off, was washed with an saturated aqueous sodium hydrogen carbonate solution and then with distilled water. The resulting oily layer was separated and dried over magnesium sulfate. The silicon base compound having isobutyric ester groups at both ends of the polymer chain was isolated as a colorless transparent oil.

In the next step, 50 ml of dehydrated and purified THF and 30 mmol of diisopropylamine were charged in another reaction vessel, cooled to 0° C. and 40 ml of a 1.6 molar concentration hexane solution of n-butyllithium was added to prepare a THF solution of LDA. To the solution, 10 mmol of the silicon base compound having isobutyric ester groups at both ends of the polymer chain was gradually added over 30 minutes or more. The reaction was further continued for an hour with stirring. Thereafter 40 mmol of trimethylsilyl chloride was added to the resultant solution and reacted for 8 hours. Low boiling components such as solvents were distilled off from the reaction mixture under reduced pressure. A polydimethylsiloxane base compound having end groups which had been converted to ketene silyl acetal was obtained. The conversion to ketene silyl acetal was confirmed by the disappearance of a C=O bond stretching vibration peak (1740 cm$^{-1}$) and the appearance of a C=C bond stretching vibration peak (1710 cm$^{-1}$) as a result of IR spectrography. The number average molecular weight of the compound was 3000.

Preparation of Tri-block Copolymer of PMA-polydimethylsiloxane-PMA

A 1 l reaction vessel equipped with an argon gas inlet tube, stirrer and gas exhaust tube was fully substituted with argon gas and charged with 300 ml of a sufficiently dehydrated and purified 1,2-dichloroethane, 50 mmol of zinc chloride and as an initiator, 5 mmol of the above-obtained polydimethylsiloxane base compound having end groups converted to ketene silyl acetal. The mixture was stirred at 0° C., and 0.5 mol of methyl acrylate (hereinafter abbreviated as MA) was added dropwise over 20 minutes with care so as to maintain the temperature of the reaction system at 50° C. or less. The polymerization reaction was carried out for an hour after finishing the dropwise addition. Then 10 ml of methanol containing 0.1 mol of hydrogen chloride was added to the reaction mixture and stirred for 10 minutes. The growing chain end of the polymer was deactivated by the procedure and the reaction was terminated.

The polymer was precipitated in methanol, filtered and dried. The tri-block copolymer PMA-polydimethylsilocane (PDMS)-PMA was obtained in the form of white powder. The block copolymer had a number average molecular weight of 11000 and a molecular weight distribution of 1.4. Tg was $-120°$ C. and 0° C.

EXAMPLE 2

A tri-block copolymer PMA-PDMB-PMA was prepared in the same manner as in Example 1, except that a diol derived from polydimethylsiloxane and having a number average molecular weight of 6000 was used as the starting material. Synthesis of the high-molecular initiator and the block copolymer were smoothly conducted. The tri-block copolymer thus prepared had a number average molecular weight of 6000 in the central polydimethylsiloxane segment and number average molecular weights of 4500 in the PMA segments on both sides. Tg was $-130°$ C. and 0° C.

EXAMPLE 3

A block copolymer having a molecular structure of P3FA-PMA-PDMS-PMA-P3FA was prepared in the same procedures as in Example 1, except that the following procedures were carried out.

After adding 0.5 mol of MA and lowering the temperature in the reaction system to 20° C., a small amount of the sample was collected. Thereafter, 0.5 ml of 2,2,2- trifluoroethyl acrylate (3FA) was added and the reaction was further continued for an hour.

Polymerization proceeded smoothly and the polymer obtained was a white powder. The intermediate block copolymer PMA-PDMS-PMA and the final product block copolymer P3FA-PMA-PDMS-PMA-P3FA had number average molecular weights of 11000 and 24000, and molecular weight distributions of 1.4 and 1.6, respectively. Tg of the final product was −120° C., −20° C. and 0° C.

EXAMPLE 4

A macromolecular initiator having ketene silyl acetal groups at both ends of the polymer chain was prepared from polyethylene glycol (PEG) having a number average molecular weight of 6000 by carrying out almost the same procedures as described in Example 1. The block copolymer PAM-PEG-PMA was prepared by using the initiator obtained above and under the same conditions as in Example 1. Polymerization proceeded smoothly and the resulting product was precipitated in hexane. The polymer thus obtained was a white powder and had a number average molecular weight of 14000 and a molecular weight distribution of 1.5. Tg was −40° C. and 0° C.

EXAMPLE 5

Preparation of Tri-block Copolymer PMMA-polydimethylsiloxane-PMMA

A 1 l reaction vessel equipped with an argon gas inlet tube, stirrer and gas exhaust tube was fully substituted with an argon gas and charged with 300 ml of a sufficiently dehydrated and purified THF, 0.2 ml of tris-dimethylaminosulfonium difluoride (0.04 mol $CH_3CN$ soltuion) and, as an initiator, 5 mmol of a polydimethylsiloxane base compound prepared by the same procedures as Example 1 and having groups converted to ketene silyl acetal at both ends of the polymer chain. The mixture was cooled to 0° C. with stirring and 0.5 mol of methyl methacrylate (MMA) was added dropwise over 20 minutes with care to maintain the temperature of the mixture at 50° C. or less. Polymerization reaction was further continued for an hour. Thereafter, 10 ml of methanol containing 0.1 mol of hydrogen chloride was added to the reaction mixture and stirred for 10 minutes. The growing chain end of the polymer was deactivated by the procedure and the reaction was terminated.

The resulting polymer was precipitated in methanol, filtered and dried. The tri-block copolymer PMMA-polydimethylsiloxane (PDMS)-PMMA was obtained in the form of a white powder.

The tri-block copolymer had a number average molecular weight of 12000 and a molecular weight distribution of 1.3. Tg was −120° C. and 90° C.

EXAMPLE 6

A tri-block copolymer PMMA-PDMS-PMMA was prepared in the same manner as in Example 5, except that a diol derived from polydimethylsiloxane and diol having a number average molecular weight of 6000 was used as the starting material. The synthesis of the high-molecular initiator and the preparation of the block copolymer proceeded smoothly.

The tri-block copolymer thus prepared had a number average molecular weight of 6000 in the central polydimethylsiloxane segment and number average molecular weights of 5000 in the PMMA segments on both sides. Tg was −130° C. and 90° C.

EXAMPLE 7

A tri-block copolymer PMMA-PDMS-PMMA was prepared in the same manner as in Example 5, except that a diol derived from polydimethylsiloxane and having the formula below was used as the starting material.

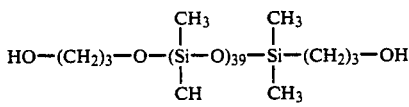

Synthesis of the high-molecular initiator and preparation of the block copolymer proceeded smoothly.

The tri-block copolymer thus prepared had a number average molecular weight of 3200 in the central polydimethylsiloxane segment and number average molecular weights of 5000 in the PMMA segments on both sides. Tg was −120° C. and 90° C.

EXAMPLE 8

A block copolymer having a molecular structure of P3FM-PMMA-PDMS-PMMA-P3FM was prepared in the same manner as in Example 5, except that the following procedures were carried out: After adding 0.5 mol of MMA and lowering temperature of the reaction system to 20° C., a small amount of sample was collected. Thereafter, 0.5 mol of 2,2,2-trifluoroethyl methaclrylate (3FM) was added with care to maintain the temperature of the reaction system at 50° C. or less. The reaction was further continued for an hour.

Polymerization proceeded smoothly. The block copolymer thus obtained was a white powder.

The intermediate block copolymer PMMA-PDMS-PMMA and the final product block copolymer P3FM-PMMA-PDMS-PMMA-P3FM had number average molecular weights of 12000 and 27000, and molecular weight distributions of 1.3 and 1.4, respectively. Tg of the final product was −120° C., 70° C. and 90° C.

EXAMPLE 9

A polyethylene oxide compound having a group converted to ketene silyl acetal at one end of the polymer chain was prepared in the same manner as in Example 1, except that the starting material used was a polyethylene oxide oligomer having a hydroxyl group at one end of the polymer chain and represented by the following formula.

The ketene silyl acetalized polyethylene oxide thus obtained had a number average molecular weight of less than 3000.

A di-block copolymer PEG-PMMA was prepared in the same manner as in Example 1, except that the above polyethylene oxide compound having a group converted to ketene silyl acetal at one end of the polymer chain was used as the initiator. The di-block copolymer had a number average molecular weight of 13000 and a molecular weight distribution of 1.2. Tg was −40° C. and 105° C.

EXAMPLE 10

Styrene was polymerized by anion living polymerization. The polymerization was terminated by the addition of ethylene oxide. The resultant polystyrene had hydroxyl groups at both ends of the polymer chain and a number average molecular weight of about 10,000.

Polystyrene having groups converted to ketene silyl acetal at both ends of the polymer chain was prepared in the same manner as in Example 1, except that the hydroxyl group containing polystyrene obtained above was used as the starting material.

Subsequently, a tri-block copolymer PMMA-PS-PMMA was prepared by carrying out the same procedures as Example 5, except that the above polystyrene having end groups converted to ketene silyl acetal was used as the initiator. The tri-block copolymer thus obtained had a number average molecular weight of 19000 and a molecular weight distribution of 1.3. Tg was 20° C. and 100° C.

The block copolymer prepared by the process of this invention is useful as a surface modifiers of polymers and as compatibilizer of polymer alloys consisting of a polymer containing, as a major component, recurring units represented by X described above or similar recurring units and an acrylic polymer, and is also preferred as materials of functional polymers such as coating resins and adhesives. Consequently, the block copolymer is very valuable in practice.

What is claimed is:

1. A process for preparing a block copolymer, which comprises conducting living polymerization of a (meth)acrylic ester substantially in the absence of water, by using a polydimethylsiloxane having a functional end group represented by the formula (1):

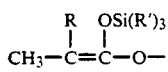

wherein R is H or an n-alkyl group having from 1 to 3 carbon atoms and R' is H or an alkyl group having from 1 to 6 carbon atoms, as a polymerization initiator and in the presence of a Lewis acid or in the presence of a donor compound of an anion selected from the group consisting of $HF_2^-$, $(CH_3)_3SiF_2^-$ and $F^-$.

2. The process of claim 1 wherein the Lewis acid is one or more compounds selected from the group consisting of a zinc halide, a monoalkylaluminum halide, a dialkylaluminum halide and a dialkylaluminum oxide.

3. The process of claim 1 wherein the donor compound of said anion is one or more of $TAS^+HF_2^-$, $TAS(CH_3)_3F_2^-$ and $(C_4H_9)_4N^+F^-$, wherein TAS is a trisdimethylsulfonium group.

4. The process of claim 1, wherein the polydimethylsiloxane has a number average molecular weight of from 400 to 100,000.

5. The process of claim 1, wherein the polydimethylsiloxane having a functional end group represented by the formula (1) has a number average molecular weight of from 1,000 to 30,000.

6. The process of claim 1, wherein the polydimethylsiloxane is a compound having the formula (2) or the formula (3):

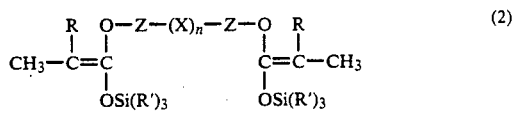

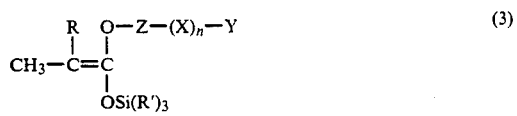

wherein R is H or an n-alkyl group having from 1 to 3 carbon atoms, R' is H or an alkyl group having from 1 to 6 carbon atoms; n is an integer of 5 or more; X is a dimethylsiloxy unit; Y is an end group which is chemically non-reactive with the polymerizing methacrylic ester; and Z is a single bond, a polymethylene group having 5 or less carbon atoms which is unsubstituted or substituted by a methyl side chain, $—(W—O)_m—$ or $W—O—W$, wherein W is a polyethylene group having 5 or less carbon atoms, which is unsubstituted or substituted by a methyl side chain, and m is an integer of 1 to 5.

7. The process of claim 1 wherein the polymerization of two or more different (meth)acrylic esters is conducted in succesive separate steps.

8. The process of claim 1, wherein R' is a methyl group.

9. The process of claim 1, wherein said process is carried out at a temperature in the range of from $-100°$ C. to 100° C.

10. The process of claim 9, wherein said process is carried out at a temperature in the range of from $-75°$ C. to 60° C.

* * * * *